United States Patent [19]

Foerster

[11] Patent Number: 4,529,780

[45] Date of Patent: Jul. 16, 1985

[54] PROCESS FOR POLYMERIZING ALPHA OLEFINS WITH PHENOLIC COMPOUND CONTAINING CATALYSTS

[75] Inventor: Rolf F. Foerster, Morris, Ill.

[73] Assignee: Northern Petrochemical Company, Omaha, Nebr.

[21] Appl. No.: 322,980

[22] Filed: Nov. 19, 1981

[51] Int. Cl.$^3$ .......................... C08F 4/64; C08F 10/06
[52] U.S. Cl. .................................... 526/142; 502/125; 502/127; 526/351; 526/907
[58] Field of Search ...................... 526/142, 907, 919

[56] References Cited

U.S. PATENT DOCUMENTS 3,399,183  8/1968  Miller ................................... 526/907
4,260,710  4/1981  Staiger et al. ........................ 526/142
4,478,989  10/1984  Goodall et al. ...................... 526/142

FOREIGN PATENT DOCUMENTS 0021478  1/1981  European Pat. Off. ............ 526/142

*Primary Examiner*—Edward J. Smith
*Attorney, Agent, or Firm*—Donald F. Haas

[57] ABSTRACT

An improved method for the preparation of homopolymers and copolymers of alpha olefins by means of a catalyst system comprising a titanium halide, an aluminum alkyl, and a phenolic compound which has a tendency to crystallize at low temperatures in the reactor feed system is disclosed. The improvement comprises prereacting a portion of the aluminum alkyl with the phenolic compound such that the components remain catalytically inactive and then activating the catalyst by adding the remainder of the aluminum alkyl to prereacted components in situ in the polymerization reactor, thereby preventing the crystallization of the phenolic compound at low temperatures in the feed system for the reactor.

2 Claims, No Drawings

PROCESS FOR POLYMERIZING ALPHA OLEFINS WITH PHENOLIC COMPOUND CONTAINING CATALYSTS

BACKGROUND OF THE INVENTION

The present invention relates to a process for the preparation of homopolymers and copolymers of alpha monoolefins by means of a catalyst system comprising a titanium halide, an aluminum-alkyl, and a phenolic antioxidant compound which is included in the catalyst formulation to increase the activity of the catalyst and also its stereospecificity. Catalyst systems such as these are known in the art. One such catalyst system utilizing hindered phenolic compounds is disclosed in German Laid Open Application DAS No. 2,841,645. Other such compounds are disclosed in my copending, commonly assigned application entitled "Polyolefin Polymerization Catalysts Containing Sterically Unhindered Phenolic Compounds".

Under most operating conditions, it is possible to handle the above compounds in standard reactor feed systems and combine them together without encountering any special problems. It is normally advantageous to make a slurry or solution of the individual components or a combination thereof in heptane or some other inert solvent prior to combining them or introducing them into the polymerization reactor. The solubility of these compounds decreases as the temperature drops. Therefore, under conditions of low temperature, they have a tendency to crystallize out of the solution. If this were to occur in the reactor feed system, which is quite possible because it normally would be exposed to the elements, the detrimental effects would be incorrect stoichiometry of the components and possible plugging of feed lines, unless steam tracing is employed.

It is an object of this invention to provide an improved polymerization process whereby a catalyst system comprising a titanium halide, an aluminum alkyl, and a phenolic compound as described above can be used even under conditions of low temperature. It is a further object of this invention to provide a method to prevent the crystallization of such phenolic compounds in the reactor feed system under conditions of low temperature.

SUMMARY OF THE INVENTION

The present invention relates to a method for the preparation of homopolymers and copolymers of alpha olefins at from 20° to 160° C. under pressure of from 1 to 100 bar, by means of a catalyst system comprising (1) a titanium halide of the formula $TiCl_3.mAlCl_3$ where m is a number from 0 to 0.5, (2) an aluminum alkyl of the formula

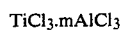

where X and Y are each alkyl of not more than 8 carbon atoms, and Z is chlorine or alkyl of not more than 8 carbon atoms, and (3) a phenolic compound which has a tendency to crystallize at low temperatures in the reactor feed system. The present invention comprises an improvement upon the above process wherein a portion of the aluminum alkyl is prereacted with the phenolic compound in a mol ratio of 1:1 to 1:3 such that the components remain inactive as a catalyst, even when the transition metal-containing component of the catalyst system has been added. The next step is activating the catalyst by adding the remainder of the aluminum alkyl to the prereacted components in situ in the polymerization reactor. This method prevents the crystallization of the phenolic compound at low temperatures in the feed system for the reactor.

DETAILED DESCRIPTION OF THE INVENTION

The polymerization process as such can—taking into account its characterizing feature—be carried out in virtually all relevant conventional technological embodiments, i.e., as a batchwise, cyclic or continuous process, which may, for example, be a suspension polymerization process, solution polymerization process, or gas phase polymerization process. The technological embodiments mentioned are well-known from the literature and from industrial practice and do not require more detailed comments.

For completeness, it should be mentioned that in the process according to the invention, the molecular weights of the polymers can be regulated by the relevant conventional measures, e.g. by means of regulators, especially hydrogen. Also, it is to be pointed out that the advantageous features of the process according to the invention in general manifest themselves particularly if the process is carried out as a gas phase polymerization (typical examples of such polymerization processes being given in German Published Applications DAS Nos. 1,217,071, 1,520,307 and 1,520,373).

Regarding the materials used in the novel catalyst system, the following details should be noted:

The titanium halide employed can be, for example, a reaction product obtained on reducing a titanium tetrahalide with hydrogen, aluminum or an aluminum-organic compound. Compounds which have proved very suitable are, for example, trichlorides of the formula $TiCl_3$, as obtained by reducing titanium tetrachloride with hydrogen, and especially co-crystals, as obtained by co-crystallizing $TiCl_3$ and $AlCl_3$ or reducing $TiCl_4$ with aluminum or with mixtures of aluminum and titanium. Co-crystals of the formula $TiCl_3.\frac{1}{3}AlCl_3$ are particularly suitable. The appropriate titanium halides are commercially available and hence do not require further comment.

If it is desired to use such a an electron donor, suitable electron donors are organic phosphines, ethers such as disclosed in U.S. Pat. Nos. 4,120,823 and 4,154,700, and esters as disclosed in U.S. Pat. No. 4,154,699. Aromatic acid esters having the formula

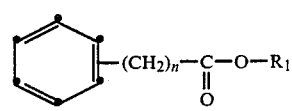

where n may be 0, 1, or 2, and where $R^1$ is alkyl, preferably $C_1$–$C_8$, or aromatic, preferably ethyl or n-butyl, are the preferred modifiers. Typical examples of very suitable aromatic acid esters are ethyl, butyl and benzyl benzoate, and ethyl, butyl and benzyl phenylacetate.

Suitable aluminum alkyls of the stated formula are again the relevant conventional compounds of this formula. These are so well known from the literature and from industrial practice that they do not require more detailed discussions here. Particularly important examples are triethylaluminum and diethylaluminum chloride.

The phenolic compounds which can be used in the present invention and for which the present invention is advantageous are those which can be advantageously used in the polymerization of alpha olefins and which have a tendency to crystallize out of solution with heptane at low temperatures. Hindered phenolic compounds such as disclosed in German Laid Open Application DAS No. 2,841,645 have the above attributes. They are represented by the following formula:

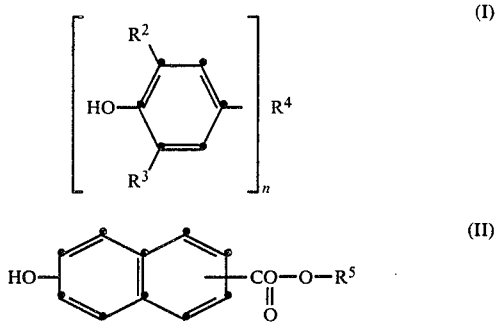

wherein $R_2$ is $C_1$–$C_6$-alkyl, especially $C_3$–$C_4$-alkyl, $R_3$ is hydrogen or $C_1$–$C_6$-alkyl, especially $C_3$–$C_4$-alkyl, $R^4$ is hydrogen or a saturated hydrocarbon radical of not more than 30, especially not more than 24, carbon atoms which may contain up to a total of 6, especially up to a total of 4, ether groups and/or ester groups, $R^5$ is $C_2$–$C_{24}$-alkyl, especially $C_4$–$C_{18}$-alkyl and n is an integer from 1 to 6, especially from 1 to 4.

Sterically unhindered phenolic compounds can also be used. They are represented by the formula

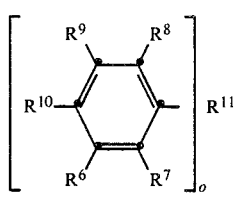

where o is an integer from 1 to 4; at least one of the $R^6$, $R^7$, $R^8$, $R^9$, or $R^{10}$ groups is hydroxyl and the remainder are selected from the group consisting of hydrogen and alkoxy, alkyl, and ester groups containing up to 12 carbon atoms, with the proviso that the groups which are in the ortho position with respect to the hydroxyl must be selected from the group consisting of hydrogen, methyl, methoxy, and ethyl; and $R^{11}$ is selected from the group consisting of hydrogen, a saturated hydrocarbon radical of not more than 30, especially not more than 24, carbon atoms, which may contain up to a total of 4 ether groups, ester groups, and/or ketone groups or thioether groups or sulfonyl groups, a nitrogen-containing heterocyclic ring structure, and an aromatic ring structure; with the proviso that if $R^{11}$ is in the ortho position with respect to the hydroxyl, then it must be selected from the group consisting of hydrogen, methyl, methoxy, and ethyl. The overall molar ratio of aluminum-alkyl: phenolic compound should be from 1:1 to 40:1.

Octadecyl-3,5-di-tert-butyl-4-hydroxyhydrocinnamate is a typical example of a sterically hindered phenolic compound useful in the present invention. N-octyl p-hydroxybenzoate, resorcinol monoacetate, and butyl-p-hydroxybenzoate are typical examples of sterically unhindered phenolic compounds useful in the present invention.

The improved method of the present invention comprises prereacting a portion of the aluminum alkyl with the phenolic compound in a mole ratio of 1:1 to 1:3 such that the components remain inactive as a catalyst, even in the presence of the titanium halide. Preferably, approximately 5 to 50 percent of the aluminum alkyl is prereacted with the phenolic compound. However, the exact amount of aluminum alkyl necessary depends upon how much of the phenolic compound is to be used in the catalyst system. The important factor is that the prereacted combination should remain catalytically inactive. The combination is then activated by adding the remainder of the aluminum alkyl to the combination in situ in the polymerization reactor. Preferably, the combination of aluminum alkyl and the phenolic compound is combined with the titanium halide component before all three are introduced into the reactor. This procedure is more convenient and makes it easier to get the correct stoichiometry in the reactor. Both the combination and the additional aluminum alkyl, as well as the titanium halide, are introduced into the reactor in a slurry with heptane or some other suitable inert solvent. Prereacting the phenolic compound with the aluminum alkyl prevents the crystallization of the phenolic compound in the feed system for the reactor under conditions of low temperature because the bulky adduct does not readily fit into a crystal lattice.

The process according to the invention makes it possible to prepare homopolymers and copolymers of alpha monoolefins in an advantageous manner, particularly suitable polymerizable alpha monoolefins being ethylene, propylene, butene-1, and 4-methylpentene-1 and copolymers thereof with ethylene.

EXAMPLE I

Diethylaluminum chloride (DEAC) and octadecyl -3,5-di-tert-butyl-4-hydroxyhydrocinnamate were combined in heptane in a mol ratio of 1:1 and then approximately 0.1 grams per ml of titanium trichloride - aluminum trichloride milled with ethylphenylacetate was added to the solution. The resulting slurry was stored under nitrogen for several days before use to ascertain its stability. Prior to polymerization, 6 mols of DEAC per mol of titanium trichloride was added directly to the reactor.

In the following experiment, 20.95 g of octadecyl-3, 5-di-tert-butyl-4-hydroxyhydrocinnamate (IRGANOX 1076®) (39.45 millimoles) was dissolved in 150 ml of heptane. Then 25.2 ml of a 25.4 percent or 1.563 molar solution of DEAC was injected (39.4 mmol), and 20 g of the milled catalyst, which contained 78.9 millimoles of $TiCl_3$, was added. Thus the mole ratio of IRGANOX 1076®/DEAC/$TiCl_3$ was 0.5/0.5/1.0.

For polymerization, 10 ml of this slurry, containing 957 mg of the milled catalyst or 582 mg $TiCl_3$ (3.775 mmol), was transferred to a reactor containing 1300 ml of n-heptane, to which 14.5 ml of 25.4 percent DEAC solution (22.65 mmol) had been added. Then gaseous propylene was charged into the reactor at the rate of 50 liters/hr and polymerized at 60° C. or 74° C. at atmospheric pressure. The results are tabulated below.

| Polymerization Time, hours | Temp. °C. | Productivity, g PP/g TiCl$_3$ | % Heptane Insolubles |
| --- | --- | --- | --- |
| 1.0 | 74 | 55.3; 55.7* | 96.5;95.8* |
| 2.0 | 74 | 90.7 | 97.7 |
| 3.0 | 74 | 129.0 | 96.9 |
| 4.0 | 74 | 160.5 | 98.1 |
| 5.0 | 74 | 207.9 | 98.1 |
| 5.0 | 60 | 237.1 | 99.4 |

*Catalyst slurry re-tested after aging for 19 days.

The data show that the catalyst system has good activity and stereospecificity, retains good activity even after residence times up to 5 hours, and gives slight improvement in heptane insolubles with polymerization time. Also, there is a further improvement at lower polymerization temperature. Furthermore, the milled catalyst slurry shows excellent storage stability.

I claim:

1. In a method for the preparation of homopolymers and copolymers of alpha olefins at from 20° to 160° C. under pressure of from 1 to 100 bar, by means of a catalyst system comprising (1) a titanium halide of the formula TiCl$_3 \cdot$m AlCl$_3$ where m is a number from 0 to 0.5, (2) an aluminum alkyl of the formula $$X-\underset{Z}{\underset{|}{Al}}-Y$$

where X and Y are each alkyl of not more than 8 carbon atoms, and Z is chlorine or alkyl of not more than 8 carbon atoms, and (3) a phenolic compound which has a tendency to crystallize at low temperatures, wherein the phenolic compound is conducted to the polymerization reactor through a feed system which is exposed to conditions of low temperature, the improvement which comprises prereacting a portion of the aluminum alkyl with the phenolic compound in a mole ratio of 1:1 to 1:3 such that the components remain catalytically inactive and then activating the catalyst by adding the remainder of the aluminum alkyl to the prereacted components in situ in the polymerization reactor, thereby preventing the crystallization of the phenolic compound at low temperatures in the feed system for the reactor.

2. The method of claim 1 wherein the titanium halide is added to the prereacted components before they are introduced into the polymerization reactor.

* * * * *